Oct. 25, 1932.　　　　R. T. OSMAN　　　　1,884,162
TRACTOR TRANSMISSION BRAKE AND CLUTCH CONTROL MECHANISM
Filed June 23, 1930　　　2 Sheets-Sheet 1
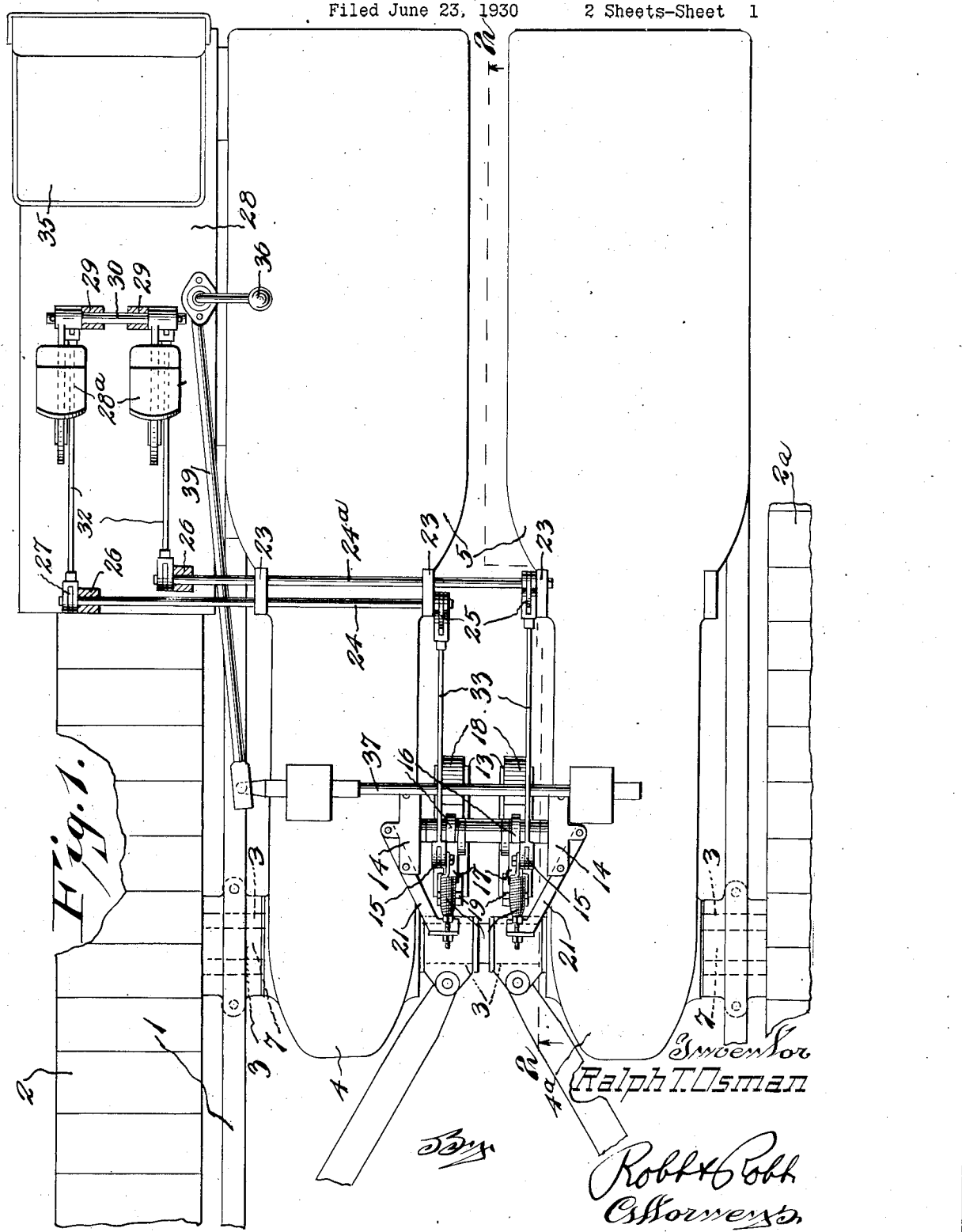

Oct. 25, 1932.  R. T. OSMAN  1,884,162
TRACTOR TRANSMISSION BRAKE AND CLUTCH CONTROL MECHANISM
Filed June 23, 1930  2 Sheets-Sheet 2
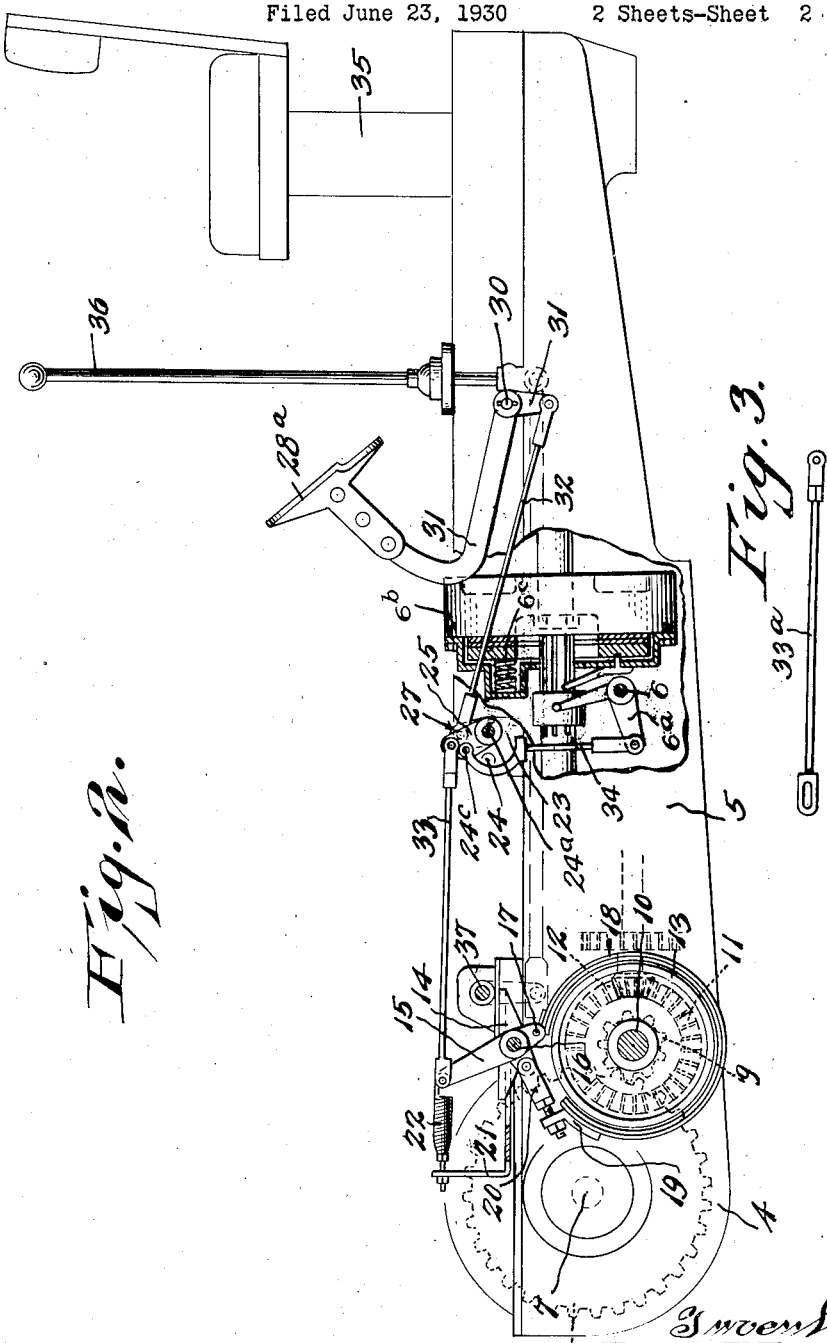

Patented Oct. 25, 1932

1,884,162

UNITED STATES PATENT OFFICE

RALPH T. OSMAN, OF MILWAUKEE, WISCONSIN, ASSIGNOR TO KOEHRING COMPANY, OF MILWAUKEE, WISCONSIN, A CORPORATION

TRACTOR TRANSMISSION BRAKE AND CLUTCH CONTROL MECHANISM

Application filed June 23, 1930. Serial No. 463,122.

This invention relates to motor vehicles and more particularly to control mechanisms for releasing the transmission clutch to disconnect the drive and subsequently apply the brake devices to retard or stop the vehicle.

An object of my invention is to provide a control mechanism in which the clutch is initially disengaged and maintained in disengaged position during the application of the brake, the mechanism being so arranged that the initial movement of the control device will compress the clutch spring to hold the clutch disengaged without the necessity of the operator actuating the brake mechanism against the clutch spring pressure.

The mechanism above referred to is primarily designed for use with dirt moving units having a dump body supported by a pair of spaced, independently driven endless belt traction devices wherein each of the traction devices is operated from a separate, independent power unit. In vehicles of this class, considerable pressure is necessary to disengage the clutch devices, and when the brake is applied incident to further movement of the clutch disengaging pedal, it should be observed that ordinarily the brake must be applied against the resisting pressure of the clutch spring. When it is desired to disengage both clutches simultaneously, considerable force is necessary, and upon brake application, the operator must work against this force or pressure, which makes the proper application of the brakes by the clutch pedal not always feasible under ordinary circumstances.

Another object of my invention, therefore, is to utilize the clutch pedals for shifting the clutches to disengaged position and also applying the brakes after the traction devices have been disengaged from their respective units, said shifting action neutralizing the pressure of the clutch spring with respect to the operator as the brakes are applied.

A further object is to provide a common actuating means for the clutch and brake devices wherein the clutch device may be shifted thereby to disengaging position and mechanically held in said position, whereupon the actuator may be subsequently shifted to cause actuation of the brake devices, together with means for causing release of the brake devices and subsequent release of the clutch holding mechanism, whereby the clutch spring is rendered operative to cause clutch engagement to render the motor units again operable to drive the traction devices.

Other and further objects and advantages of the invention will be hereinafter set forth and the novel features thereof defined by the appended claims.

In the drawings:

Fig. 1 is a plan view of a traction vehicle of the class described, having my invention applied thereto;

Fig. 2 is a section on line 2—2 of Fig. 1; and

Fig. 3 is a modified form of connector link.

Like reference characters designate like parts in the several figures of the drawings in which 1 denotes a main frame which is supported by a pair of endless belt traction devices 2, 2a pivoted to the main frame 1 at 3.

Disposed on the main frame 1, in side-by-side relation, are the motor transmission units 4, 4a which are adapted to drive the traction devices 2, 2a respectively. Each of the motor units consists of a base 5 forming the crank case for the engine, clutch and transmission devices which are not shown in the drawings.

The clutch 6b of each of the motor units is of the usual spring pressed multiple disc type and is disengaged by actuation or rocking in the direction of the arrow in Fig. 2, of the shaft 6 hereinafter called the clutch shaft. This actuation compresses the clutch spring 6c, and upon release of the clutch shaft 6, the clutch spring 6c forces the clutch into engagement in the usual manner.

The transmissions (not shown) are disposed in the bases 5 and serve to establish variable speed driving relations between the clutches and the traction devices 2, 2a. The drive to the traction devices is through the drive shafts 7 which extend concentrically through the pivotal mountings 3 for the said traction devices. Each of the shafts 7 carries a gear 8 meshing with the gear 8 carried on the brake drum shaft 10. Ths shaft 10 also carries a bevel gear 11, meshing with the bevel gear pinion 12 carried by the variable speed transmission (not shown). The shafts 10 of the motor units extend through the base and have secured thereto the brake drums 13. Bolted to the bases 5, directly above the shafts 10, are brake lever carrying brackets 14 on which are pivotally supported the brake actuating levers 15. These brake levers 15 are carried intermediate their ends, as above indicated, at 16, the short arms of the levers being pivoted to the live ends 17 of the brake bands 18.

The dead ends 19 of the brake bands 18 are secured to the brake lever brackets 14 through the adjustable connectors 20, said connectors permitting the relative adjustment of the two brake devices, as well as the independent adjustment of the brake devices with respect to the clutch actuating devices, as will be hereinafter set forth. The brake lever brackets 14 carry extensions 21 for supporting one end of the clutch and brake release springs 22.

Rotatably mounted in bearings 23 which are fixed to the motor units substantially above the clutch shafts 6, are the clutch and brake actuating shafts 24, 24a. These shafts carry fixed to one end thereof the clutch and brake actuators 25. The other ends of the shafts 24, 24a are carried in bearings 26 and have fixed thereto the arms 27. The bearings 26 are carried by the operator's platform 28 which also carries the combined clutch release and brake pedals 28a. These pedals are provided with arms 31 extending beyond the pivotal center 30 and have attached thereto the actuating links 32 which are in turn connected to the arms 27 carried by the clutch and brake actuating shafts 24. Similar actuating links 33 connect the brake levers 15 with the clutch and brake actuators 25. A third set of links 34 connects the clutch shaft levers 6a with the actuators 25, and the pivotal connections of these links with respect to the shafts 24, 24a are of particular importance.

Referring to Fig. 2, it should be observed that the upper portions of the clutch links 34 terminate in the curved or hook shaped extensions which are arranged to permit the pivotal connections 24c of the clutch links 34 to move over the center of the clutch and brake actuator shafts 24, 24a, whereby the load or tension of the clutch springs (not shown) is carried by the shafts 24, 24a, thereby permitting the operator on the platform 28 to operate the pedals 28a after the clutches have been disengaged, without the necessity of resisting the tension of the clutch springs above referred to.

The arrangement and adjustment of the brake devices is such that during the initial movement of the actuators 25 produced by pressure on the pedals 28a, the pivotal connections 24c will move upwardly around the central axis of the shafts 24, 24a to a position substantially thereabove. During this actuation, the clutches (not shown) will be disengaged, and the tension of the clutch springs (not shown) will be substantially carried by the shafts 24, 24a and their respective supports 23. Upon further depression of the pedals 28a by the operator, the brake actuating levers 15 become effective to engage the brake bands 18 with the brake drums 13 carried by the shafts 10, which, as previously pointed out, are geared to the main drive shafts 7 directly connected with the traction devices 2, 2a.

It should be observed that as the application of each brake is effected, the pivotal connection 24c of each clutch actuator link moves directly over the center of its respective supporting shaft, whereby the entire load of the clutch spring is carried by the shaft, the actuator 25 and the supporting bearing 23, and upon further movement of the actuator, the pivotal connection 24c moves beyond the center of the shaft. In other words, when the connection 24c passes beyond the dead center position, where the shaft 24 and pivot between the clutch link 34 and clutch shaft 6a are in alignment, then the tension of the clutch spring (not shown) will actually become effective to assist in the application of the brake due to the fact that the downward pull of the clutch link 34 will tend to rotate the shaft 24 and the actuator 25 in a clockwise direction, the curved portion of the link 34 permitting a certain limited movement beyond the dead center position referred to, before the link strikes the shaft 24.

Upon partial release of the pedal by the operator, the release spring 22 will effect a rocking to the left of the brake actuating lever 15 and a release of the frictional engagement of the brake bands 18; also the actuator 25 will be shifted by the actuating link 33 to move the pivotal connection 24c beyond the dead center position previously referred to, whereupon the clutch spring tension will again become effective to rotate the shaft 24 in a counterclockwise direction and also cause engagement of the main driving clutch located within the bases 5.

The operator's platform 28 is provided with the usual operator's seat 35 suitably positioned with respect to the pedals 28a so that easy and convenient manipulation thereof may be obtained.

The variable speed transmission devices (not shown) located in the motor unit bases 5 are controlled by the common gear shifting lever 36 through the intermediate shiftable rods and connections 37. These elements, not forming a part of the present invention, are not described in detail.

While the clutch and brake devices are herein described with reference to a vehicle having two independent motor units, it is within the purview of my invention to apply the same to substantially all types of motor vehicles where it is desired to utilize a pair of independently controlled traction devices for steering purposes.

In the drawings I have disclosed brake actuating levers 15 as being connected directly to the clutch and brake actuators 25 through the instrumentality of the actuating links 33, but when desirable I contemplate using link members 33a, as disclosed in Fig. 3, which have a slotted connection with the brake actuating levers 15. By using a link of this character, it is possible to completely disengage the clutch before any actuation whatever of the brake devices occurs, and consequently under some circumstances this construction would be desirable. For instance, the clearance between the brake bands 18 and the drums 13 could be less when the brakes are in released position if a link of the type just described were used in place of the link as shown in Fig. 2.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In a transmission clutch and brake device of the class described, a control device for causing actuation of the clutch device and subsequent application of the brake device, said control device including a shaft and actuator for the clutch and brake devices, a connection between the clutch actuating device and the actuator adapted to move over the shaft whereby the tension of the clutch spring is carried by the shaft, and a connection between the brake device and the actuator for actuating the brake device.

2. In a control device adapted for use with motor vehicles of the class described having a frame, a pair of traction devices for supporting the frame, motor transmission units carried by the frame for driving the traction devices, each of said units including a spring engaged clutch for interrupting the drive to the traction devices, a brake mechanism for controlling the operation of each of the traction devices and including a manually controlled actuator for the clutch and brake devices of each unit, and connections between each actuator of each set of clutch and brake mechanisms whereby movement of each actuator with respect to its associated clutch and brake mechanism will cause disengagement of the clutch, neutralization of the clutch spring pressure with respect to the operation of the actuator and subsequent application of the brake mechanism.

3. In a control device of the class described for use with a motor vehicle having a supporting frame, a pair of traction devices carried thereby, means for driving the traction devices, a clutch operating shaft adapted to disengage a spring pressed clutch associated with the drive to each traction device, a clutch shaft lever fixed to said clutch shaft, a brake mechanism associated with each traction device, a clutch and brake actuator, an operating shaft for said actuator, a link pivoted to the clutch lever and the clutch and brake actuator, and a pivotal connection between the link and the actuator being movable into alignment with the axis of the actuator shaft and the connection between said link and the clutch shaft lever when the actuator is moved to disengage the clutch whereby the tension of the clutch spring is supported by the clutch and brake actuator shaft.

4. In transmission clutch and brake control devices for motor traction vehicles of the class described having traction devices, spring pressed traction driving clutches and brake mechanisms for controlling the traction devices, each of said control devices including a clutch shaft rotatable for disengaging the clutch, a clutch lever for rotating the shaft, a combined clutch and brake actuator and shaft mounted on the vehicle, a link having a connection at one end to the free end of said lever and a second shiftable connection at the other end to the actuator, said second connection movable into a plane extending through the first connection and the axis of the clutch and brake actuator shaft when said shaft is rotated to disengage the traction clutch of the motor vehicle whereby the load of the clutch spring is entirely carried by said connections and shaft to hold the clutch in disengaged position, and manual means for moving the actuator to shift the said second connection.

5. In transmission clutch and brake control devices for motor traction vehicles of the class described having traction devices, spring pressed traction driving clutches and brake mechanisms for controlling the traction devices, each of said control devices including a clutch shaft rotatable for disengaging the clutch, a clutch lever for rotating the shaft, a combined clutch and brake actuator and shaft mounted on the vehicle, a link having a connection at one end to the free end of said lever and a second shiftable connection at the other end to the actuator, said second connection movable into a plane extending through the first connection and the axis of the clutch and brake actuator shaft when said shaft is rotated to disengage the traction clutch of the motor vehicle whereby the load of the clutch spring is entirely carried by said connections and shaft to hold the clutch in disengaged position, manual means for moving the actuator to shift the said second connection, and a second link connection between the brake mechanism and the clutch and brake actuator arranged to cause application of the brake mechanism as the aforesaid second shiftable connection moves into alignment.

6. In a traction vehicle, a clutch element and a brake element, a brake actuating shaft, a pedal for operating said brake actuating shaft, a brake actuator on the brake actuating shaft, a clutch shaft positioned below said actuating shaft, spring means normally urging said clutch shaft in one direction, a clutch shaft lever secured to the clutch shaft, a link connecting the clutch shaft lever with the brake actuator, said link extending around one side of the clutch actuating shaft and being adapted upon operation of the brake actuator by said pedal to have its pivotal point of connection with the brake actuator pass over the dead center position of the brake actuator with respect to the shaft on which it is mounted, whereby the tension in the clutch spring will amplify and assist the application of the brake, due to operation of said pedal.

In testimony whereof I affix my signature.

RALPH T. OSMAN.